(12) United States Patent
Shimizu et al.

(10) Patent No.: US 6,176,122 B1
(45) Date of Patent: Jan. 23, 2001

(54) CANTILEVER UNIT AND SCANNING PROBE MICROSCOPE UTILIZING THE CANTILEVER UNIT

(75) Inventors: Nobuhiro Shimizu; Yukihiro Sato, both of Chiba (JP)

(73) Assignee: Seiko Instruments Inc. (JP)

( * ) Notice: Under 35 U.S.C. 154(b), the term of this patent shall be extended for 0 days.

(21) Appl. No.: 09/197,587

(22) Filed: Nov. 19, 1998

(30) Foreign Application Priority Data

Nov. 20, 1997 (JP) .................................................. 9-320185

(51) Int. Cl.[7] ....................................................... G01B 5/28
(52) U.S. Cl. ................................................. 73/105; 73/812
(58) Field of Search ............................... 73/104, 105, 812

(56) References Cited

U.S. PATENT DOCUMENTS

| | | | |
|---|---|---|---|
| 5,469,733 | * 11/1995 | Yasue et al. ........................... 73/105 |
| 5,594,166 | * 1/1997 | Itoh et al. ............................... 73/105 |
| 5,633,455 | * 5/1997 | Quate ..................................... 73/105 |
| 5,834,643 | * 11/1998 | Cheng .................................... 73/105 |
| 5,907,095 | * 5/1999 | Lin ......................................... 73/105 |

* cited by examiner

*Primary Examiner*—Max Noori
(74) *Attorney, Agent, or Firm*—Adams & Wilks

(57) ABSTRACT

A cantilever unit comprises a substrate and a self-detecting type cantilever attached to the substrate. The self-detecting type cantilever has a cantilever portion extending from the substrate and a probe tip depending from the cantilever portion and detects a deflection of the cantilever portion when, for example, the probe tip is scanned over a surface of a sample. A visual identification portion of the cantilever unit permits the cantilever unit to be visually distinguished from other cantilever units.

25 Claims, 5 Drawing Sheets

CANTILEVER UNIT AND SCANNING PROBE MICROSCOPE UTILIZING THE CANTILEVER UNIT

BACKGROUND OF THE INVENTION

The present invention relates to a cantilever unit suitable for a scanning atomic force microscope (AFM) which is a typical scanning probe microscope, and more particularly to a cantilever unit having a self-detecting type cantilever outputting an electric signal in response to deflection of the cantilever itself.

In the scanning atomic force microscope (AFM), a cantilever having an exploring needle at a free end is used as a scanning probe. In the configuration, because attraction or repulsion based on interatomic force appears between surface of a sample and the exploring needle by scanning the exploring needle on the surface of the sample, a shape of the surface of the sample can be measured by detecting the interatomic force a as deflection of the cantilever.

Although deflection of said cantilever is measured by detecting an optically displacement quantity of a reflecting beam radiated to a back surface of the cantilever, there is a problem that the configuration is complex and adjusting is difficult in the way detecting optically deflection of the cantilever. Therefore, a self-detecting type cantilever is developed recently which directly outputs detected deflection as electric signal forming a detecting circuit for detecting deflection on the cantilever.

The self-detecting type cantilever having the above-mentioned configuration is installed on the main body of the microscope as a cantilever unit in the detachable state holding the cantilever on the surface of semiconductor substrate in cantilever type because it is difficult to handle alone.

In the scanning probe microscope, there are various modes except the above-mentioned AFM mode. They are a friction force microscope (FFM) mode detecting change of friction applied between surface of sample and cantilever as deflection of horizontal direction of the cantilever, a magnetic force microscope (MFM) mode measuring magnetic distribution of surface of sample detecting magnetic force by AC detecting method making an exploring needle magnetized and cantilever resonate, and a tunnel microscope mode measuring surface shape by applying voltage between surface of sample and cantilever, and by controlling and detecting tunnel current flowing through between them.

In any of operation modes, an exclusive cantilever unit can be selectively installed without changing the main body of the device. Therefore, an operator should selectively install a cantilever unit corresponding to the desired operation mode on the main body of the device.

Here, it is difficult to identify each cantilever unit with the naked eye because the cantilever units are not very small in size but also are little difference in their constructions though shape and size of the cantilever portion is different from each other depending on their kinds. Therefore, it has been difficult to identify the desired cantilever unit when the cantilever unit suitable for the desired operation mode is searched among the stock. It has been difficult to identify too the cantilever unit being installed now on the main body of the device.

An object of the present invention is to provide a cantilever unit enable to identify simply kinds of cantilever units with eyes solving the conventional above-mentioned problem.

SUMMARY OF THE INVENTION

To achieve the above-mentioned object, the present invention is characterized by that proper identification data is recorded for use of the concerned cantilever unit, namely each self-detecting type cantilever installed on the concerned cantilever unit.

According to the above-mentioned configuration, the types of the concerned cantilever units are identified so as to become easy to identify the cantilever unit by only confirming identification data without confirming the construction of the cantilever units.

DETAILED DESCRIPTION OF THE PREFERRED EMBODIMENTS

Figure 1:
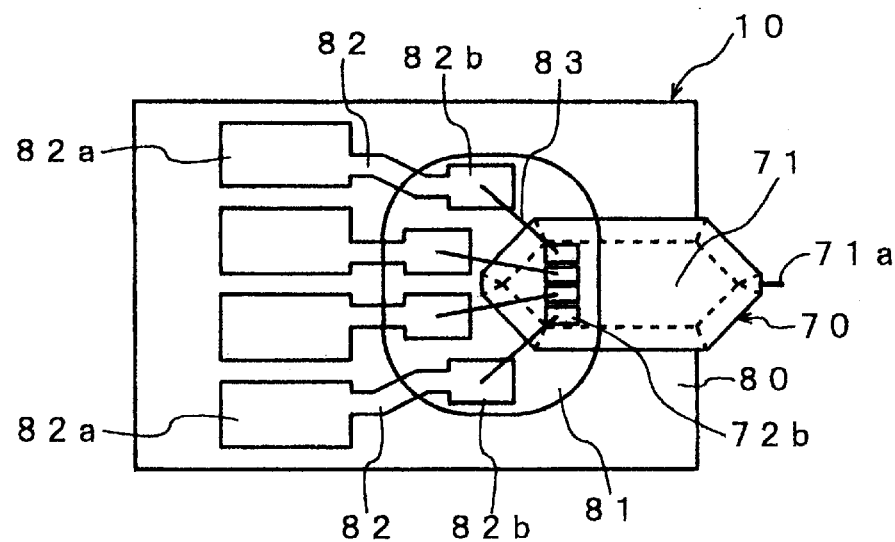
FIG. 1 is a plane view of a cantilever unit according to the present invention.
Figure 2:
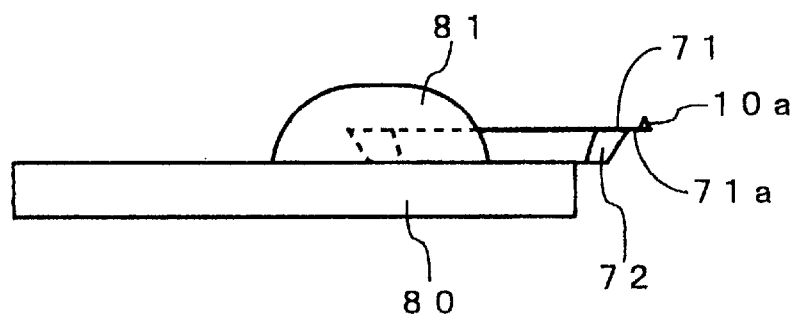
FIG. 2 is a side view of FIG. 1.

Referring to the figures, the present invention will be described in detail. A configuration of a cantilever unit installing a self-detecting type cantilever will be described first. FIG. 1 is a plane view showing a cantilever unit 10, and FIG. 2 is a side view of FIG. 1.

The cantilever unit 10 comprises a self-detecting cantilever 70 and a glass epoxy substrate 80. The self-detecting cantilever 70 comprises thin plate shaped silicon substrate 71 and thick plate shaped silicon substrate 72 being layered as shown in FIG. 2, an exploring needle 10a is formed at free end of a cantilever beam portion 71a projecting from one end of the thin plate shaped silicon substrate 71. The self-detecting type cantilever 70 is held by a glass epoxy substrate 80 so that at least the cantilever beam portion 71a projects from the end portion as shown in FIG. 1.

A detecting circuit (not shown) an outputting electric signal in response to a to deflection quantity of the beam portion 71a and bonding pads 72b for power supply line and signal line of the detecting circuit are formed on main surface where the exploring needle 10a is on the silicon substrate 71. On the glass epoxy substrate 80, a plural of wiring patterns 82 are formed. At one end of each wiring pattern 82, contact patterns 82a for external connecting are formed, and at other end, bonding pads 82b are formed.

The bonding pads 72b of the silicon substrate 71 and the bonding pads 82b of the glass epoxy substrate 80 are connected with bonding wires 83, and a plastic mold 81 are performed on bonding wires 83 and each bonding pad 72b and 82b.

Figure 3:
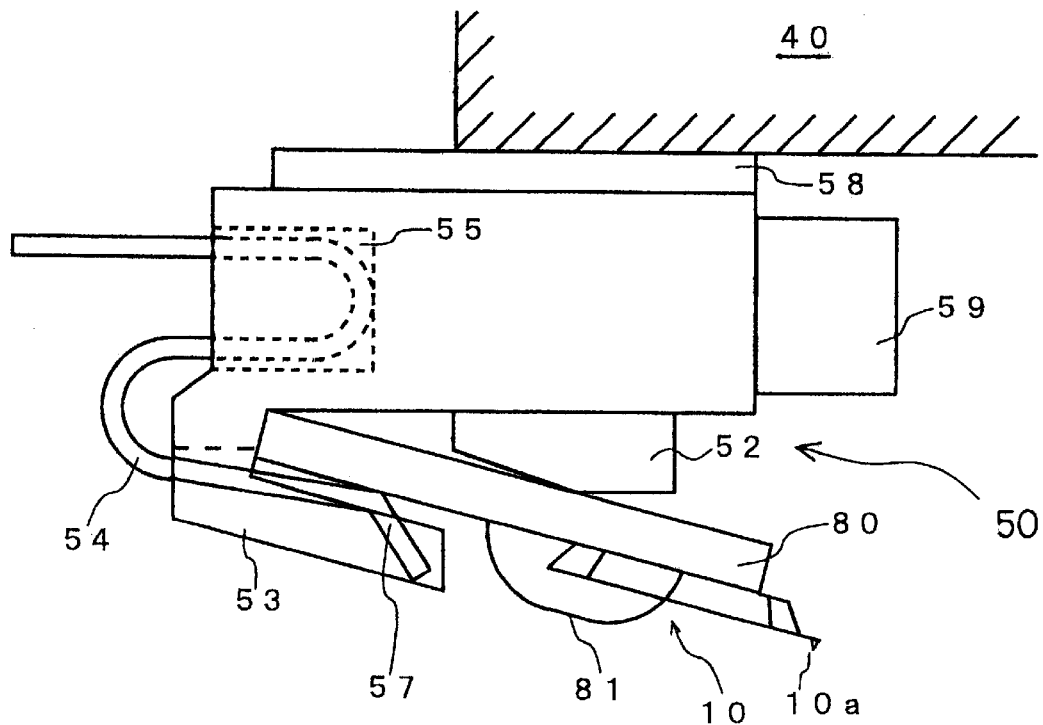
FIG. 3 is a side view showing a cantilever unit holder with the cantilever unit of the present invention installed thereon.

FIG. 3 is a side view showing a cantilever unit holder 50 for holding said cantilever unit wherein the cantilever unit 10 is installed. The cantilever unit holder 50 is fixed at the main body 40 of the device through a piezoelectric plate 58. The piezoelectric plate 58 is formed in order to make the cantilever resonate during observation of a soft sample such as biological molecule.

At one side of the holder 50, a plural of grooves 55 in which U-shaped portion of each S-shaped elastic body electrode 54 is inserted. Under the holder 50, pectination-shaped electrode guide 53 is supported like cantilever so as to face to the main body keeping predetermined gap. The pectination of the electrode guide 53 is constructed so as to lack a part thereof at the position corresponding to said each groove 55.

One U-shaped portion of each elastic electrode 54 is inserted in each groove 55, and a bending portion 57 of a part from the other U-shaped portion to end elastically projects from pectination of the electrode guide 53 into the gap as shown in the figure. At other side of the holder, a prism 59 is fixed, and at under thereof, a cantilever table 52 is formed.

A cantilever unit 10 is inserted into the gap portion between the cantilever table 52 and the electrode guide 53 diagonally upward from the down part. The cantilever unit 10 is pushed to the cantilever 52 side by elastic force thereof after being inserted into the gap so as to be put between the electrode 54 and the cantilever table 52 because the cantilever unit 10 is inserted resisting elastic force of the electrode 54 elastically projecting toward the gap. Each electrode 54 is previously positioned so that the bending portion 57 contacts with each contact pattern 82a of the glass epoxy substrate 80 when the cantilever unit 10 is inserted to the correct position.

Figure 4:
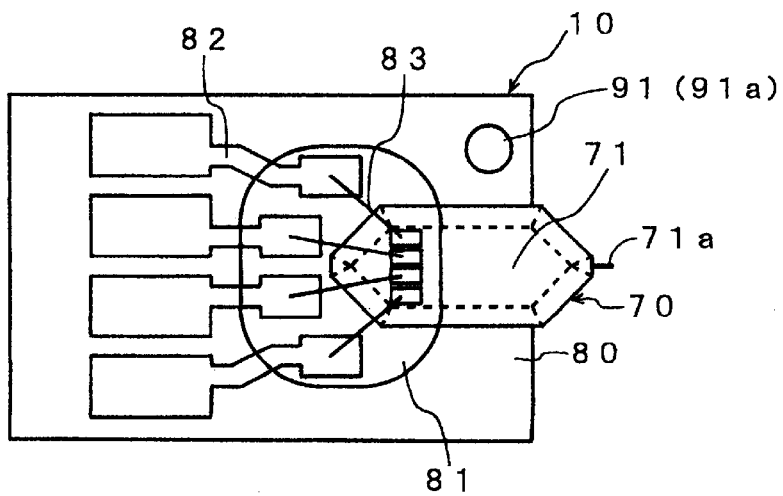
FIG. 4 is a plane view showing a first embodiment (No. 1) of the present invention.
Figure 5:
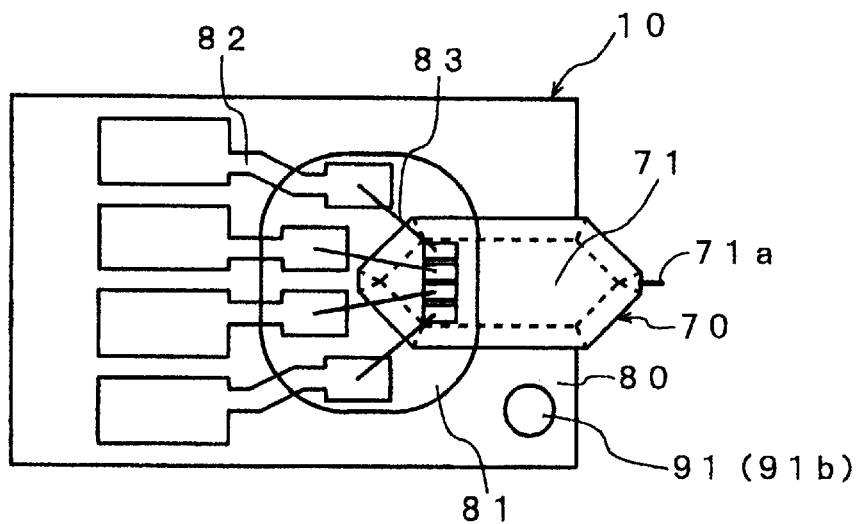
FIG. 5 is a plane view showing a first embodiment (No. 2) of the present invention.

FIGS. 4 and 5 are plane views of a cantilever unit 10 of a first embodiment of the present invention. The same symbols show the same or similar parts as above-mentioned. The present embodiment, is characterized by that a dummy pattern for a mark is formed at differ position of surface of a substrate from others depending on kinds of the cantilever.

If the cantilever unit 10 is used for AFM for example, a circular dummy pattern 91a is formed at upper right corner of the glass epoxy substrate 80 as shown in FIG. 4. If the cantilever unit 10 is used for MFM, a circular dummy pattern 91b is formed at down right corner of the glass epoxy substrate 80 as shown in FIG. 5. It is desirable that the above-mentioned dummy pattern mark 91 is formed at the same time with the same process as forming wiring patterns 82.

According to the present embodiment, kinds of cantilevers can be easily identified based on the position formed at the surface of the glass epoxy substrate 80 without confirming the structure of the self-detecting cantilever 70.

Figure 6:
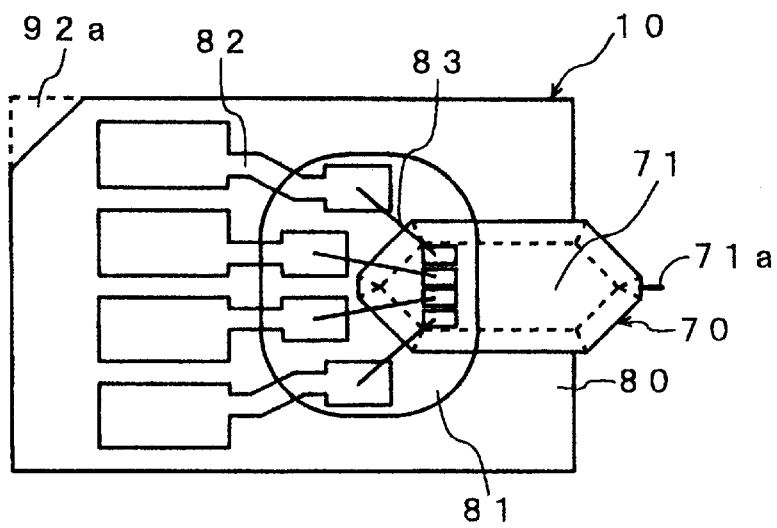
FIG. 6 is a plane view showing a second embodiment (No. 1) of the present invention.
Figure 7:
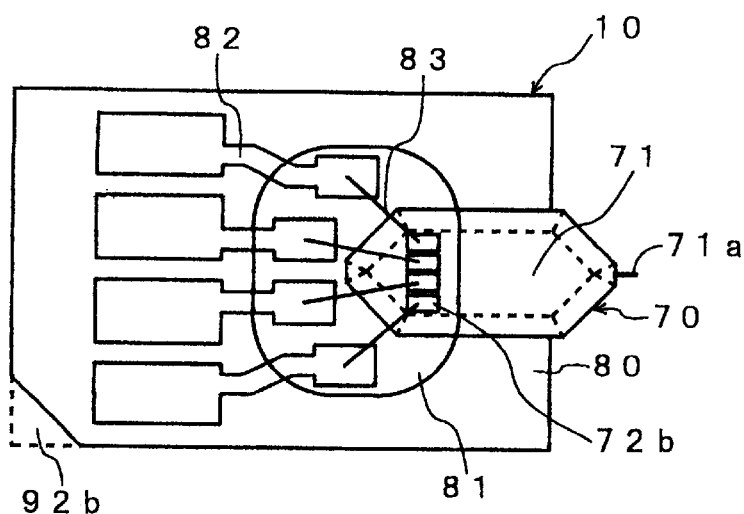
FIG. 7 is a plane view showing a second embodiment (No. 2) of the present invention.

FIGS. 6 and 7 are plane views of cantilever units 10 of a second embodiment of the present invention. The same symbols show the same or similar parts as above-mentioned. The present embodiment is characterized by that any of four corners of a glass epoxy substrate 80 is cut down depending on kinds of the cantilever units 10.

If the cantilever unit 10 is for AFM for example, an upper right corner 92a of the glass epoxy substrate 80 is cut down as shown in FIG. 6. If the cantilever unit 10 is for MFM, a down right corner 92b of the glass epoxy substrate 80 is cut down as shown in FIG. 5.

According to the present embodiment, kinds of cantilevers can be easily identified based on the cut down position of the glass epoxy substrate 80 without confirming the structure of the self-detecting type cantilever 70.

Figure 8:
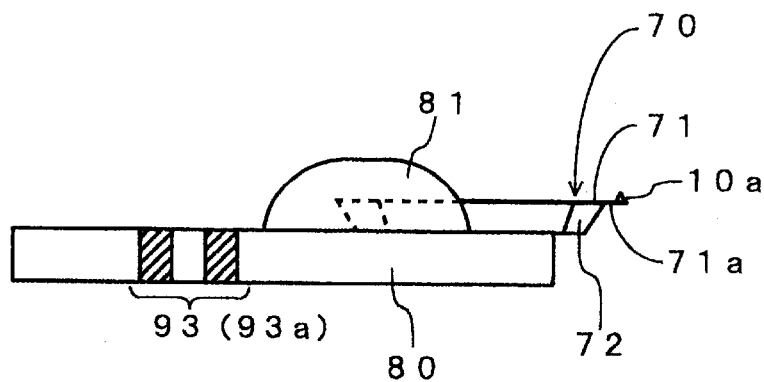
FIG. 8 is a plane view showing a third embodiment (No. 1) of the present invention.
Figure 9:
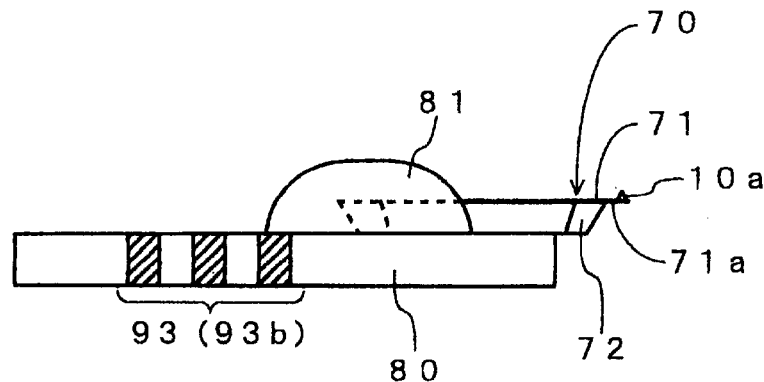
FIG. 9 is a plane view showing a third embodiment (No. 2) of the present invention.

FIGS. 8 and 9 are plane views of cantilever units 10 of a third embodiment of the present invention. The same symbols show the same or similar parts as above-mentioned. The present embodiment is characterized by that different pattern 93 from others is formed at side of a glass epoxy substrate 80 depending on kinds of the cantilever units 10.

If the cantilever unit 10 is used for AFM for example, a pattern 93a having two lines is formed at side of the glass epoxy substrate 80 as shown in FIG. 8. If the cantilever unit 10 is used for MFM, a pattern 93b having three lines is formed as shown in FIG. 9.

According to the present embodiment, kinds of cantilevers can be easily identified based on the pattern 93 marked at side of the glass epoxy substrate 80 without confirming the structure of the self-detecting cantilever 70. Moreover, in the present invention, kinds of the cantilever units 10 can be identified even if the cantilever unit 10 is installed at the cantilever holder because the pattern 93 for identification is marked at side of the glass epoxy substrate 80.

Figure 10:
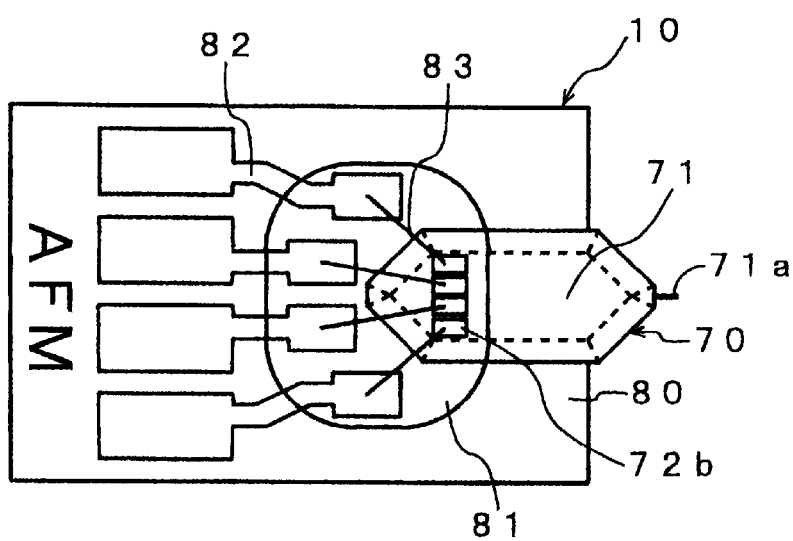
FIG. 10 is a plane view showing a fourth embodiment (No. 1) of the present invention.
Figure 11:
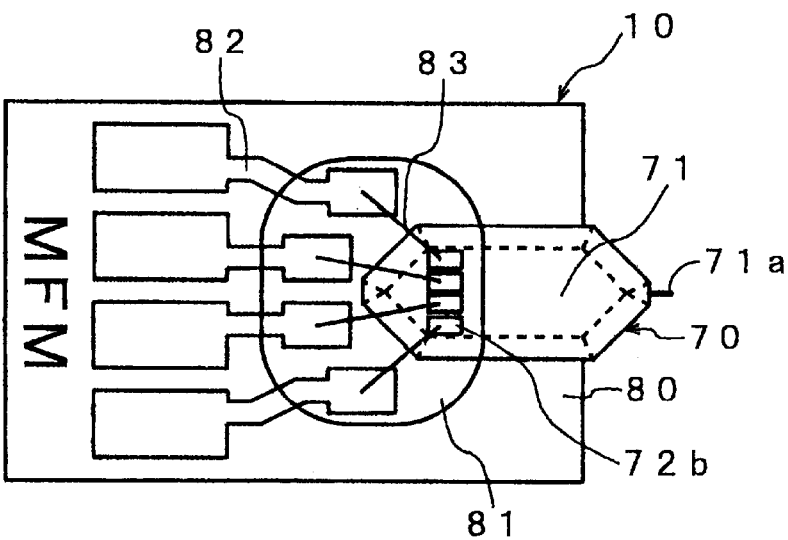
FIG. 11 is a plane view showing a fourth embodiment (No. 2) of the present invention.

FIGS. 10 and 11 are plane views of cantilever units 10 of a fourth embodiment of the present invention. The same symbols show the same or similar parts as above-mentioned. The present embodiment, is characterized by that character, number or the like expressing concretely kinds of the cantilever units 10.

If the cantilever unit 10 is used for AFM for example, characters "AFM" are marked at surface of the glass epoxy substrate 80 as shown in FIG. 10. If the cantilever unit 10 is used for MFM, characters "MFM" are marked as shown in FIG. 11.

According to the present embodiment, kinds of cantilevers can be easily identified based on the symbols marked at surface of the glass epoxy substrate 80 without confirming the structure of the self-detecting cantilever 70.

Although in each embodiment, the substrates forming newly a mark on surface thereof and being newly cut down at a part thereof are described, the substrate may be identified by, for example, color of the plastic mold 81 depending on kinds of the cantilever units 10.

Combination of the above-mentioned embodiments can be used so as to become possible to distinguish more kinds of the cantilever units.

According to the present invention, kinds of cantilevers can be easily identified only by confirming identification data without confirming the structure of the self-detecting cantilever.

What is claimed is:

1. A cantilever unit comprising: a self-detecting type cantilever for detecting deflection of a free end thereof; a substrate for supporting the self-detecting type cantilever such that the free end thereof extends from an end of the substrate; and visual identification means for visually identifying the cantilever unit and distinguishing the cantilever unit from other cantilever units.

2. A cantilever unit according to claim 1; wherein the visual identification means comprises an identification mark disposed on a preselected surface portion of the substrate such that the cantilever unit is visually distinguishable from other cantilever units by the identification mark.

3. A cantilever unit according to claim 1; wherein the visual identification means comprises a preselected part of the substrate from which a portion of the substrate has been cut such that the cantilever unit is visually distinguishable from other cantilever units by the cut portion of the preselected part of the substrate.

4. A cantilever unit according to claim 1; wherein the visual identification means comprises an identification pattern disposed on the substrate such that the cantilever unit is visually distinguishable from other cantilever units by the identification pattern.

5. A cantilever unit according to claim 1; wherein the visual identification means comprises an identification symbol having a preselected shape and disposed on a surface of the substrate such that the cantilever unit is visually distinguishable from other cantilever units by the preselected shape of the identification symbol.

6. A cantilever unit according to claim 1; further comprising a sealing material molded on a surface of the substrate and having a preselected color; and wherein the visual identification means comprises the preselected color of the sealing material for visually distinguishing the cantilever unit from other cantilever units by the color of the sealing material.

7. A cantilever unit according to claim 1; further comprising a wiring pattern formed on the substrate; and wherein the visual identification means is formed on the substrate simultaneously with the wiring pattern, and by the same process.

8. In a scanning probe microscope for observing and measuring topographical characteristics of a sample, a cantilever unit according to claim 1 for scanning a surface of the sample.

9. In a scanning probe microscope for observing and measuring topographical characteristics of a sample, a cantilever unit according to claim 2 for scanning a surface of the sample.

10. In a scanning probe microscope for observing and measuring topographical characteristics of a sample, a cantilever unit according to claim 3 for scanning a surface of the sample.

11. In a scanning probe microscope for observing and measuring topographical characteristics of a sample, a cantilever unit according to claim 4 for scanning a surface of the sample.

12. A cantilever unit according to claim 5; further comprising a wiring pattern formed on the substrate; and wherein the identification symbol is formed on the substrate simultaneously with the wiring pattern and by the same process.

13. In a scanning probe microscope for observing and measuring topographical characteristics of a sample, a cantilever unit according to claim 5 for scanning a surface of the sample.

14. In a scanning probe microscope for observing and measuring topographical characteristics of a sample, a cantilever unit according to claim 6 for scanning a surface of the sample.

15. In a scanning probe microscope for observing and measuring topographical characteristics of a sample, a cantilever unit according to claim 7 for scanning a surface of the sample.

16. A cantilever unit comprising: a substrate; a self-detecting type cantilever attached to the substrate and having a cantilever portion extending from the substrate and a probe tip depending from the cantilever portion, the self-detecting type cantilever detecting a deflection of the cantilever portion when the probe tip is scanned over a surface of a sample; and visual identification means for visually identifying the cantilever unit and distinguishing the cantilever unit from other cantilever units.

17. A cantilever unit according to claim 16; wherein the visual identification means comprises an identification mark disposed on a preselected surface portion of the substrate such that the cantilever unit is visually distinguishable from other cantilever units by the identification mark.

18. A cantilever unit according to claim 17; wherein the substrate has an upper surface, a lower surface and a plurality of side surfaces disposed between the upper and lower surfaces; and wherein the identification mark is disposed on a preselected surface portion of the upper surface of the substrate.

19. A cantilever unit according to claim 16; wherein the visual identification means comprises a preselected part of the substrate from which a portion of the substrate has been cut such that the cantilever unit is visually distinguishable from other cantilever units by the cut portion of the preselected part of the substrate.

20. A cantilever unit according to claim 19; wherein the preselected part of the substrate comprises a corner portion of the substrate.

21. A cantilever unit according to claim 16; wherein the visual identification means comprises an identification pattern disposed on the substrate such that the cantilever unit is visually distinguishable from other cantilever units by the identification pattern.

22. A cantilever unit according to claim 21; wherein the substrate has an upper surface, a lower surface and a plurality of side surfaces disposed between the upper and lower surfaces; and wherein the identification pattern is disposed on one of the side surfaces of the substrate.

23. A cantilever unit according to claim 16; wherein the visual identification means comprises an identification symbol having a preselected shape and disposed on a surface of the substrate such that the cantilever unit is visually distinguishable from other cantilever units by the preselected shape of the identification symbol.

24. A cantilever unit according to claim 16; further comprising a sealing material molded on a surface of the substrate and having a preselected color; and wherein the visual identification means comprises the preselected color of the sealing material such that the cantilever unit is visually distinguishable from other cantilever units by the color of the sealing material.

25. In a scanning probe microscope for observing and measuring topographical characteristics of a sample, a cantilever unit according to claim 16 for scanning a surface of the sample.

* * * * *